J. A. REIMER.
DRAFT EVENER FOR HARROWS.
APPLICATION FILED JULY 9, 1920.
1,399,999.
Patented Dec. 13, 1921.
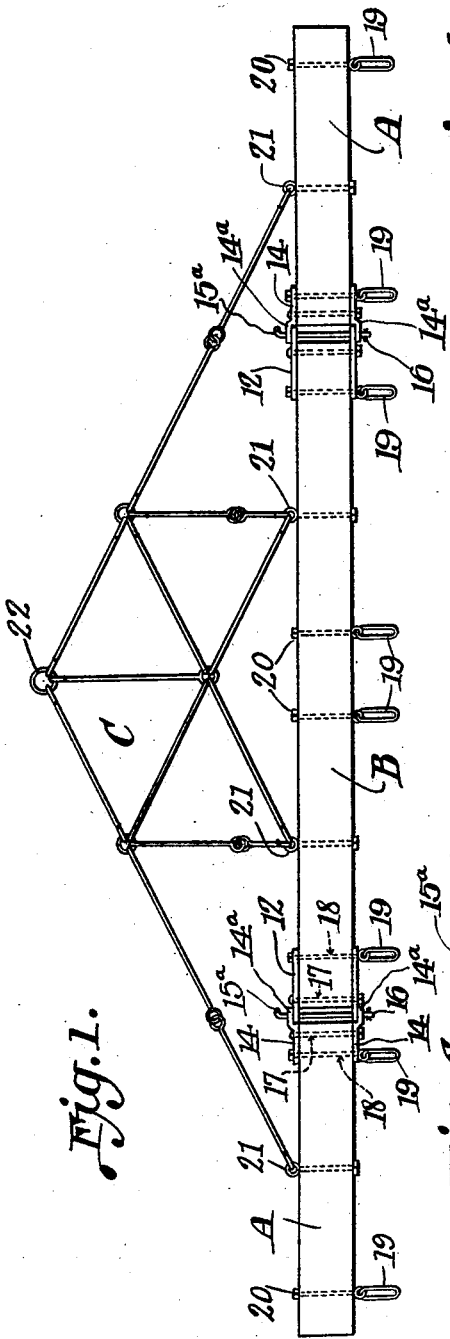

UNITED STATES PATENT OFFICE.

JORGEN ALFRED REIMER, OF ELK HORN, IOWA, ASSIGNOR OF ONE-HALF TO HANS CHRISTIAN HANSEN, OF ELK HORN, IOWA.

DRAFT-EVENER FOR HARROWS.

1,399,999.  Specification of Letters Patent.  Patented Dec. 13, 1921.

Application filed July 9, 1920. Serial No. 394,989.

*To all whom it may concern:*

Be it known that I, JORGEN ALFRED REIMER, a subject of the King of Denmark, residing at Elk Horn, in the county of Shelby and State of Iowa, have invented or discovered certain new and useful Improvements in Draft-Eveners for Harrows, of which the following is a specification, reference being had therein to the accompanying drawing.

This invention relates to draft evener bars for winged or multi-sectional harrows, and has for its object to provide an improved hinge or pivot joint between two sections of the draft evener bar, and which joint is of such construction that the outer section or sections, when in horizontal position, will be held rigidly against downward movement, but will be free to be turned upward, as is frequently desirable in passing through narrow gates or the like, and when thus turned upward will be supported vertically on the inner section or sections, the pivot-pin or pins of the joint or joints being preferably held in place in such a manner that it or they may be removed without the use of tools, when it is desired to unjoint and remove an outer section or sections from an inner section; all as will hereinafter more fully appear.

In the accompanying drawing Figure 1 is a plan view of a harrow draft evener bar embodying the present invention. Fig. 2 is a detail plan view illustrating the improved joint, and Figs. 3 and 4 are detail views of one set of the joint plates which are shown in different relative positions in the two views. Fig. 5 is a detail view of the joint plates.

Referring to the drawing, A denotes the outer sections of the draft evener bar, and B denotes the inner section which is herein shown as being of a double length as compared with the outer sections. Attached to the section B are plates 12 provided at their lower edges with outwardly extending projections 13 which projections extend beneath and are overlapped by the plates 14 attached to the section A. The plates 14 are provided with offset portions 14ª overlapping the outside of the plates 12, and, passing through the overlapped portions of these two sets of plates is a pivot pin 15 which is provided with a handle or portion 15ª, and which pin is preferably held in place by a cotter pin 16 so that when an outer harrow section is to be unjointed from an inner harrow section the pivot pin 15 may be removed without the use of tools, the cotter pin 16 being easily removed in the usual manner. The plates 12 have cut-away portions at their outer ends to enable the plates 14 to be turned up on the hinge joint afforded by the pin 15, and when the outer section A, to which the plates 14 are attached, is turned to a vertical position the plates 14 will rest on the plates 12 (see Fig. 4) so that the outer harrow section will be maintained in a vertical position.

This result is due to the fact that there are straight vertical shoulders on the plates 14 inside of the offset parts 14ª of said plates, and each draft evener bar section A has at its end a corresponding vertical straight shoulder (see Fig. 5) which will rest on the upper horizontal surface of the adjacent draft evener bar section B.

The plates 12 and 14 are preferably secured to the draft evener bar sections A and B by bolts 17 and 18, the bolts 18 being preferably formed as eye-bolts for the attachment of links 19 with which the harrow sections may be connected. Also the draft evener bar is preferably provided with additional eye-bolts 20 having attaching links 19, as also with additional bolts 21 with which the jointed draft connection, denoted generally by C, and consisting of a series of hooked rods connected together by rings or links and also connected to the eye-bolts 21. This draft connection C, in the form herein shown, is intended for use with a tractor which will be connected in any suitable manner with the ring 22 at the apex or forward end of this connection.

From the foregoing it will be apparent that the invention provides a joint, between the inner and outer sections of a multi-sectional harrow draft bar, which joint is of such construction that the outer section or sections will be held rigidly against downward movement, when in horizontal position, but will be free to be turned upward when desired; the pivot pin of the hinge joint being secured in place in such a way that it may be readily removed, in unjointing an outer section of the draft bar, without the use of tools. It will also be apparent that in raising the outer jointed sections of the harrow, as indicated in Fig.

4, this can be done from the rear of the harrow, so that the driver or operator need not go to the front of the harrow, as would be necessary if the outer sections were to be unjointed, and thus the driver or operator will be in no danger, such as he might be subjected to at the front of the harrow, should the horses move forward or run away, or should the tractor, if such be used, be accidentally started.

Having thus described my invention I claim and desire to secure by Letters Patent:

The combination with two sections of a harrow draft evener bar, of a joint consisting of two inner plates attached to the opposite sides of an inner section of a draft evener bar and having outwardly extending projections at their lower edges, two outer plates attached to an outer section of said bar and overlapping said projections, and a pin pivotally connecting said plates and thus affording a joint between said sections, said outer plates and said outer section of said bar having straight vertical shoulders adapted to rest on the said inner plates and said inner draft bar section to support said outer section in an upright position when said outer section is turned up on said pin.

In testimony whereof I affix my signature.

JORGEN ALFRED REIMER.